US012553283B2

(12) United States Patent
Hou et al.

(10) Patent No.: US 12,553,283 B2
(45) Date of Patent: Feb. 17, 2026

(54) SHUTTER CONTROLLER

(71) Applicant: WOAN TECHNOLOGY (SHENZHEN) CO., LTD., Guangdong (CN)

(72) Inventors: Wei Hou, Shenzhen (CN); Buliao Wei, Guangdong (CN); Kai Huang, Shenzhen (CN); Hua Yang, Shenzhen (CN); Yang Pan, Shenzhen (CN); Jiangang Li, Shenzhen (CN)

(73) Assignee: WOAN TECHNOLOGY (SHENZHEN) CO., LTD., Guangdong (CN)

(*) Notice: Subject to any disclaimer, the term of this patent is extended or adjusted under 35 U.S.C. 154(b) by 295 days.

(21) Appl. No.: 18/357,963

(22) Filed: Jul. 24, 2023

(65) Prior Publication Data

US 2024/0026737 A1 Jan. 25, 2024

(30) Foreign Application Priority Data

Jul. 25, 2022 (CN) ......................... 202210878136.7
Nov. 25, 2022 (CN) ......................... 202211490411.4

(51) Int. Cl.
*E06B 9/322* (2006.01)
*E06B 9/70* (2006.01)

(52) U.S. Cl.
CPC ................ *E06B 9/70* (2013.01); *E06B 9/322* (2013.01)

(58) Field of Classification Search
CPC . E06B 9/30; E06B 9/303; E06B 9/304; E06B 9/305; E06B 9/306; E06B 9/307;
(Continued)

(56) References Cited

U.S. PATENT DOCUMENTS 4,644,990 A * 2/1987 Webb, Sr. ................. E06B 9/32 160/5
4,979,550 A * 12/1990 Long ......................... E06B 9/74 160/5
(Continued)

FOREIGN PATENT DOCUMENTS

CN 203515279 U 4/2014
CN 105275365 A * 1/2016
(Continued)

OTHER PUBLICATIONS

International Search Report, dated Sep. 22, 2023 for corresponding International Application No. PCT/CN2023/098857, with English translation (total 8 pages).

(Continued)

*Primary Examiner* — Johnnie A. Shablack
(74) *Attorney, Agent, or Firm* — Intellectual Property Law Group LLP; Juneko Jackson

(57) ABSTRACT

A shutter controller configured to control an operating rod of a shutter includes a controller housing, a clamping mechanism, and a driving mechanism. The controller housing includes a first housing and a second housing connected to each other, and the second housing is provided with a receiving cavity. The clamping mechanism is configured to clamp the operating rod and rotatably provided in the receiving cavity. The driving mechanism is provided in the first housing and is in transmission connection with the clamping mechanism, and the driving mechanism is configured to drive the clamping mechanism to rotate, thereby driving the operating rod to rotate.

19 Claims, 16 Drawing Sheets

(58) Field of Classification Search
CPC . E06B 9/32; E06B 9/322; E06B 9/326; E06B 9/70; E06B 9/68; E06B 9/74; E06B 2009/3222; E06B 2009/6809
See application file for complete search history.

(56) References Cited

U.S. PATENT DOCUMENTS

| | | | | | |
|---|---|---|---|---|---|
| 5,444,339 | A * | 8/1995 | Domel | E06B 9/364 | 318/400.41 |
| 5,495,153 | A * | 2/1996 | Domel | E06B 9/364 | 318/16 |
| 5,517,094 | A * | 5/1996 | Domel | E06B 9/368 | 318/400.29 |
| 5,547,008 | A * | 8/1996 | Sullivan | E06B 9/32 | 160/DIG. 17 |
| 5,603,371 | A * | 2/1997 | Gregg | E06B 9/307 | 160/DIG. 17 |
| 5,760,558 | A * | 6/1998 | Popat | E06B 9/32 | 160/188 |
| 5,850,863 | A * | 12/1998 | Huang | E06B 9/326 | 160/176.1 R |
| 5,996,957 | A * | 12/1999 | Kurtz | A47G 23/0225 | 248/231.21 |
| 8,640,762 | B2 * | 2/2014 | Wong | E06B 9/32 | 160/307 |
| 8,981,681 | B2 * | 3/2015 | Malekpour | H02K 49/104 | 318/40 |
| 9,161,649 | B2 * | 10/2015 | Rastegar | E06B 9/322 | |
| 9,206,638 | B1 * | 12/2015 | Malekpour | E06B 9/368 | |
| 9,869,124 | B2 * | 1/2018 | Hall | E06B 9/308 | |
| 10,072,458 | B2 * | 9/2018 | Mullet | E06B 9/368 | |
| 10,847,983 | B2 * | 11/2020 | Nien | E06B 9/32 | |
| 11,414,927 | B1 * | 8/2022 | Popat | E06B 9/78 | |
| 11,608,679 | B2 * | 3/2023 | Schmidt | E06B 9/38 | |
| 11,624,234 | B2 * | 4/2023 | Zilberbaum | E06B 9/322 | 160/176.1 P |
| 12,281,751 | B2 * | 4/2025 | Corrie | F16B 2/18 | |
| 2008/0303686 | A1 * | 12/2008 | Mosbrucker | E06B 9/322 | 160/168.1 P |
| 2013/0087295 | A1 | 4/2013 | Wong | | |
| 2017/0260804 | A1 | 9/2017 | Wu | | |
| 2017/0362888 | A1 * | 12/2017 | Vinogradova | E06B 9/68 | |
| 2022/0186555 | A1 | 6/2022 | Hung | | |
| 2024/0026737 | A1 * | 1/2024 | Hou | E06B 9/70 | |
| 2024/0093551 | A1 * | 3/2024 | Jiang | E06B 9/262 | |

FOREIGN PATENT DOCUMENTS

| | | | | | |
|---|---|---|---|---|---|
| CN | 205493471 | U | | 8/2016 | |
| CN | 205955614 | U | | 2/2017 | |
| CN | 209637627 | U | * | 11/2019 | |
| CN | 115012798 | A | | 9/2022 | |
| CN | 115263168 | A | | 11/2022 | |
| CN | 217976030 | U | | 12/2022 | |
| CN | 217976031 | U | | 12/2022 | |
| CN | 217976032 | U | | 12/2022 | |
| CN | 217976033 | U | | 12/2022 | |
| CN | 218206521 | U | | 1/2023 | |
| CN | 115898234 | A | * | 4/2023 | |
| CN | 218991444 | U | | 5/2023 | |
| CN | 115012798 | B | * | 1/2024 | E06B 9/322 |
| EP | 0563014 | A1 | | 9/1993 | |
| JP | 2002213163 | A | | 7/2002 | |
| JP | 2022048834 | A | | 3/2022 | |
| KR | 101849987 | B1 | | 4/2018 | |

OTHER PUBLICATIONS

China Office Action, dated May 31, 2023 for corresponding China Application No. 202210878136.7 with English translation (14 pages).

* cited by examiner

SHUTTER CONTROLLER

CROSS-REFERENCE TO RELATED APPLICATIONS

This application claims priority of Chinese Patent Application No. 202210878136.7, filed on Jul. 25, 2022, entitled "SHUTTER CONTROLLER", and Chinese Patent Application No. 202211490411.4, filed on Nov. 25, 2022, entitled "SHUTTER CONTROLLER". The contents of the above identified applications are hereby incorporated herein in their entireties by reference.

TECHNICAL FIELD

The present disclosure relates to smart home products, and in particular to a shutter controller.

BACKGROUND

In conventional shutter systems, an operating rod of a shutter is operated manually to open and close the shutter, so as to adjust brightness. In order to automatically open and close the shutter to adjust brightness, an electric control rod of the shutter is designed. The electric control rod is only suitable for some shutters with pull rods, and the pull rod is required to be removed before mounting the electric control rod. The disassembly and assembly of the electric control rod are complicated and the adaptability thereof is poor, which results in a poor user's experience.

SUMMARY

Accordingly, a shutter controller is provided, which can solve the problem of complicated disassembly and assembly steps and poor adaptability of conventional shutter controllers.

A shutter controller configured to control an operating rod of a shutter includes a controller housing, a clamping mechanism, and a driving mechanism. The controller housing includes a first housing and a second housing connected to each other, and the second housing is provided with a receiving cavity. The clamping mechanism is configured to clamp the operating rod and rotatably provided in the receiving cavity. The driving mechanism is provided in the first housing and is in transmission connection with the clamping mechanism, and the driving mechanism is configured to drive the clamping mechanism to rotate, thereby driving the operating rod to rotate.

According to the shutter controller, the clamping mechanism is arranged in the second housing, the driving mechanism is arranged in the first housing, the driving mechanism drive the clamping mechanism to rotate, and then the operating rod is driven to rotate, which facilitates the electric control of the opening and closing of the shutter.

In one of the embodiments, the clamping mechanism is detachably mounted in the receiving cavity.

In one of the embodiments, the second housing includes a main body and an opening cover, the main body is connected to the first housing, and the opening cover is connected to the main body to form the receiving cavity.

In one of the embodiments, one end of the opening cover is rotatably connected to one end of the main body, the other end of the opening cover is locked to the other end of the main body by locking components, and the locking components include a first locking portion provided on the opening cover and a second locking portion provided on the main body. When the first locking portion and the second locking portion are engaged, the main body and the opening cover are locked, when the first locking portion is disengaged from the second locking portion, the opening cover is rotatable relative to the main body to expose the receiving cavity.

In one of the embodiments, the second housing further includes a locking plate on which the first locking portion is provided, and the locking plate is movably provided on the opening cover, and is configured to engage or disengage the first locking portion and the second locking portion.

In one of the embodiments, the second housing further includes a locking plate including the second locking portion, and the locking plate is movably provided on the main body, and is configured to engage or disengage the first locking portion and the second locking portion.

In one of the embodiments, the first locking portion or the second locking portion includes a guiding surface, the guiding surface is configured to guide the first locking portion to be engaged with the second locking portion, the second housing further includes an elastic member provided between the locking plate and the main body, and the elastic member is configured to reset the locking plate after the second locking portion and the first locking portion are engaged or disengaged.

In one of the embodiments, the clamping mechanism includes at least two clamping portions configured to cooperatively clamp the operating rod.

In one of the embodiments, at least one of the clamping portions is movable or rotatable to release the operating rod from the clamping mechanism.

In one of the embodiments, the clamping mechanism is provided with a clamping cavity configured to allow the operating rod to extend through, the clamping mechanism further includes a bushing, the bushing is detachably provided in the clamping cavity and is fixed on a periphery of the operating rod.

In one of the embodiments, the shutter controller further includes a transmission mechanism connected to the clamping mechanism and the driving mechanism, and a clutch mechanism capable of being connected to or separated from the transmission mechanism. When the clutch mechanism is in an engaged state, an output power of the driving mechanism is transmitted to the transmission mechanism through the clutch mechanism, the transmission mechanism drives the clamping mechanism to rotate, thereby driving the operating rod to rotate, when the clutch mechanism is in a disengaged state, the clutch mechanism is disengaged from the transmission mechanism, and the operating rod is capable of rotating manually.

In one of the embodiments, the shutter controller further includes a mounting base configured to be mounted on a fixed mounting surface and a connecting member. A first end of the connecting member is provided with a first connecting structure, a second end of the connecting member is provided with a second connecting structure connected to the mounting base, and the controller housing is fixedly connected or integrally formed with the first connecting structure.

In one of the embodiments, the second connecting structure is movable relative to the fixed mounting surface to adjust a position of the controller housing in a vertical direction.

In one of the embodiments, the mounting base includes a first mounting base and a second mounting base, the first mounting base is fixedly connected to the second connecting structure, the first mounting base is slidably connected the second mounting base, the second mounting base is fixedly connected to the fixed mounting surface, and a position of the second connecting structure is adjusted by adjusting a relative position between the first mounting base and the second mounting base to adjust the position of the controller housing.

In one of the embodiments, the first mounting base is provided with a first sliding block, the second mounting base is provided with a first sliding groove, and the first sliding block is slidably received in the first sliding groove. Alternatively, the second mounting base is provided with a first sliding block, the first mounting base is provided with a first sliding groove, and the first sliding block is slidably received in the first sliding groove.

In one of the embodiments, a side wall of the first sliding groove is provided with a first positioning convex edge, a side wall of the first sliding block is provided with a second positioning convex edge cooperating with the first positioning convex edge, and when the first sliding block is placed in the first sliding groove, the second positioning convex edge is simultaneously placed in the first sliding groove.

In one of the embodiments, the first mounting base or the second connecting structure is provided with a third engaging portion, the second mounting base is provided with a fourth engaging portion, and when the fourth engaging portion is engaged with the third engaging portion, the position of the second connecting structure is fixed.

In one of the embodiments, the shutter controller further includes a pressing member connected to the first mounting base or the second connecting structure, and the pressing member is pressed to disengage third engaging portion from the fourth engaging portion, so as to enable the second connecting structure to move relative to the fixed mounting surface.

In one of the embodiments, a first end of the pressing member is provided with an elastic connecting portion connected to the first mounting base or the second connecting structure, and a second end of the pressing member extends outward to form a pressing portion, the pressing member is capable of swinging between a first position and a second position by pressing the pressing portion, when the pressing member is located at the first position, the third engaging portion is engaged with the fourth engaging portion, and when the pressing member is located at the second position, the third engaging portion is separated from the fourth engaging portion.

In one of the embodiments, the third engaging portion is provided with a rack, and the fourth engaging portion is provided with a strip-shaped wedge block configured to be engaged with the rack. Alternatively, the third engaging portion is provided with a wedge block, and the fourth engaging portion is provided with a rack configured to be engaged with the wedge block.

In one of the embodiments, the shutter controller further includes a cover plate provided an outer side the second connecting structure. The cover plate is connected to the mounting base to place the second connecting structure between the cover plate and the mounting base. One side or two opposite sides of the cover plate are provided with a through groove, and the second connecting structure is connected to a solar power generation assembly or a adapter through the through groove.

Details of one or more embodiments of the present disclosure are set forth in the following drawings and descriptions. Other objects, purposes and advantages will become apparent upon review of the following specification, drawings and claims.

BRIEF DESCRIPTION OF THE DRAWINGS

In order to illustrate the embodiments of the present disclosure more clearly, the drawings used in the embodiments will be described briefly. Apparently, the following described drawings are merely for the embodiments of the present disclosure, and other drawings can be derived by those of ordinary skill in the art without any creative effort.

DETAILED DESCRIPTION OF THE EMBODIMENTS

Figure 1:
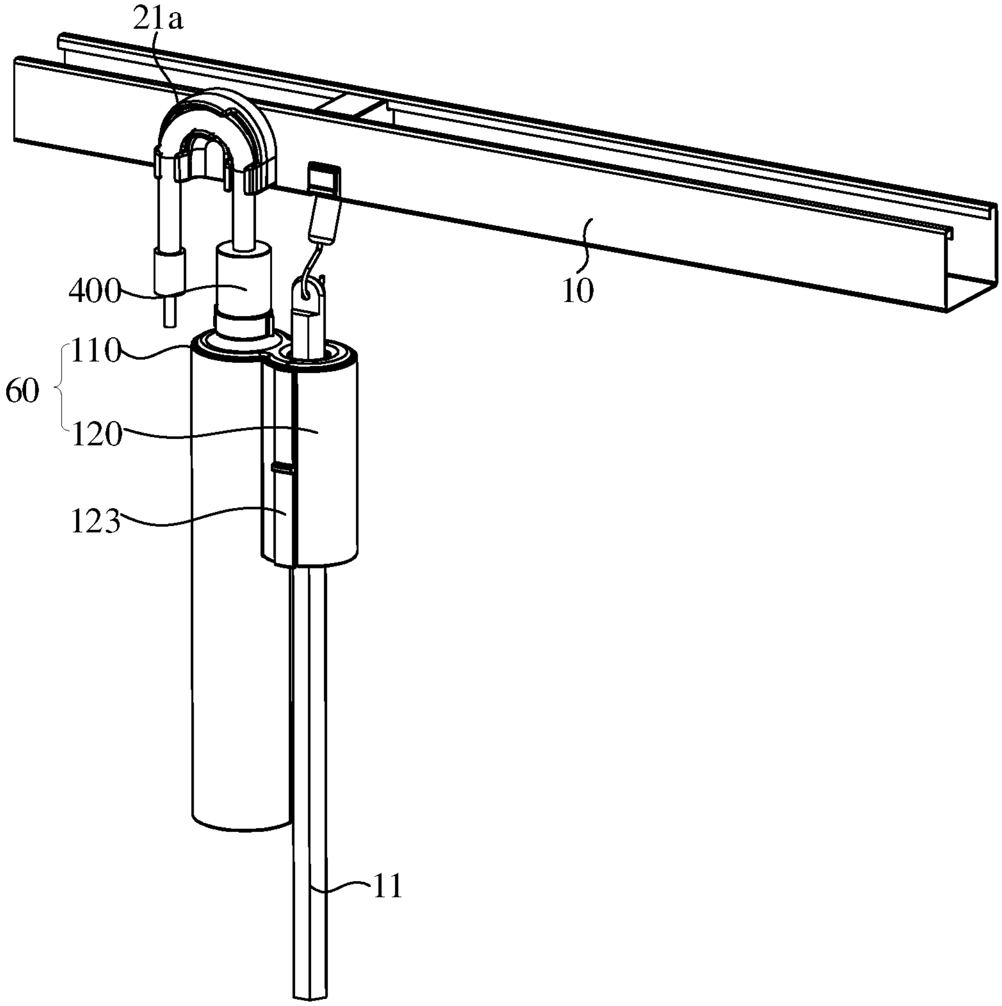
FIG. 1 is a perspective view of a shutter controller according to an embodiment of the present disclosure.

In order to make the above objects, features and advantages of the present disclosure clear and easier to understand, the specific embodiments of the present disclosure are described in detail below in combination with the accompanying drawings. Many specific details are set forth in the following description to facilitate a full understanding of the present disclosure. However, the present disclosure can be implemented in many ways different from those described herein, and those skilled in the art can make similar improvements without departing from the connotation of the present disclosure. Therefore, the present disclosure is not limited by the specific embodiments disclosed below.

In the description of the present disclosure, it should be understood that the terms "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential direction" are based on the azimuth or position relationship shown in the attached drawings, which are only for the convenience of describing the present disclosure and simplifying the description, rather than indicating or implying that the device or element must have a specific azimuth, be constructed and operated in a specific azimuth, so such terms cannot be understood as a limitation of the present disclosure.

In addition, the terms “first” and “second” are only used for descriptive purposes and cannot be understood as indicating or implying relative importance or implicitly indicating the number of indicated technical features. Thus, the features defined with “first” and “second” may explicitly or implicitly include at least one of the features. In the description of the present disclosure, “multiple” means at least two, such as two, three, etc., unless otherwise expressly and specifically defined.

In the present invention, unless otherwise expressly specified and limited, the terms “mount”, “connect”, “contact”, “fix” and other terms should be understood in a broad sense, for example, they can be fixed connections, removable connections, or integrated. They can be mechanical connection or electrical connection. They can be directly connected or indirectly connected through an intermediate medium. They can be the connection within two elements or the interaction relationship between two elements, unless otherwise expressly limited. For those skilled in the art, the specific meaning of the above terms in the present disclosure can be understood according to the specific situation.

In the present invention, unless otherwise expressly specified and limited, the first feature “above” or “below” the second feature may be in direct contact with the first and second features, or the first and second features may be in indirect contact through an intermediate medium. Moreover, the first feature is “above” the second feature, but the first feature is directly above or diagonally above the second feature, or it only means that the horizontal height of the first feature is higher than the second feature. The first feature is “below” of the second feature, which can mean that the first feature is directly below or obliquely below the second feature, or simply that the horizontal height of the first feature is less than that of the second feature.

It should be noted that when an element is called “fixed to” or “provided on” another element, it can be directly on another element or there can be a centered element. When an element is considered to be “connected” to another element, it can be directly connected to another element or there may be intermediate elements at the same time. The terms “vertical”, “horizontal”, “up”, “down”, “left”, “right” and similar expressions used herein are for the purpose of illustration only and do not represent the only embodiment.

Referring to FIG. 1, a shutter controller is provided according to an embodiment of the present disclosure, which is configured to control an operating rod 11 of a shutter. Further referring to FIG. 2 and FIG. 8, the shutter controller includes a controller housing 60, a clamping mechanism 200, a driving mechanism 300, and a mounting mechanism 400. The mounting mechanism 400 includes a mounting base 20 and a connecting member 30 connected between the mounting base 20 and the controller housing 60, and the controller housing 60 is provided on a fixed mounting surface through the mounting base 20. The clamping mechanism 200 is configured to clamp the operating rod 11 and is rotatably provided in the controller housing 60. The driving mechanism 300 is in transmission connection with the clamping mechanism 200, and the driving mechanism 300 is configured to drive the clamping mechanism 200 to rotate, thereby driving the operating rod 11 to rotate.

Figure 2:
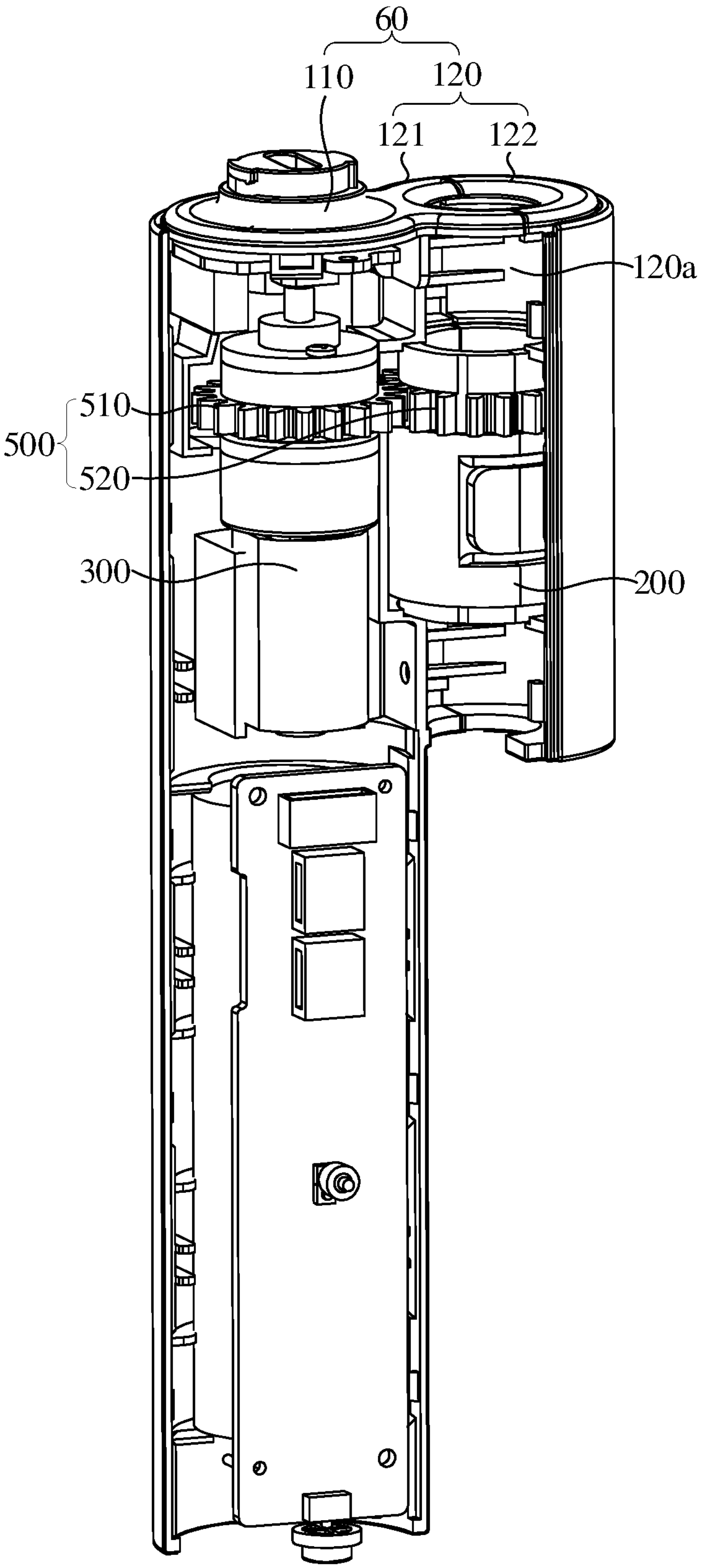
FIG. 2 is an exploded perspective view of the shutter controller shown in FIG. 1.

It should be noted that, referring to FIG. 1 and FIG. 2, the shutter includes a curtain rod 10 and a plurality of blades (not shown) mounted on the curtain rod 10. The driving mechanism 300 drives the clamping mechanism 200 to rotate and drives the operating rod 11 to rotate to open and close the plurality of blades, thereby achieving the opening and closing of the shutter.

According to the shutter controller, the controller housing 60 is arranged on the fixed mounting surface through the mounting mechanism 400, which is convenient for disassembly and assembly. The operating rod 11 is clamped by the clamping mechanism 200 to facilitate the rotation of the operating rod 11, thereby better controlling the opening and closing of the blades of the shutter.

Specifically, the fixed mounting surface may be a surface of the curtain rod 10, a wall or a window sill, etc. One end of the mounting mechanism 400 is mounted to the fixed mounting surface, and the other end of the mounting mechanism 400 is connected to the controller housing 60 of the shutter controller. In this way, the controller housing 60 of the shutter controller is mounted to the curtain rod 10 of the shutter through the mounting mechanism 400, and the clamping mechanism 200 clamps the operating rod 11, so that the mounting of the shutter controller can be achieved without interfering with the rotation of the operating rod 11.

In this embodiment, the mounting mechanism 400 and the controller housing 60 are separate components, and the two are detachably connected. In other embodiments, the mounting mechanism 400 and the controller housing 60 may also be integrally formed, which has good integrity and high mechanical strength.

In one embodiment, the mounting base 20 is fixed to the fixed mounting surface by screws, bolts or glue. In other embodiments, the mounting base 20 may also be hung on the curtain rod 10, or the entire controller housing 60 is supported in other ways.

Referring to FIG. 1 and FIG. 2, the controller housing 60 includes a first housing 110 and a second housing 120 connected to each other. The second housing 120 includes a main body 121 and an opening cover 122. The opening cover 122 is connected to the main body 121 to form a receiving cavity **120*a*, and the main body 121 is connected to the first housing 110. The clamping mechanism 200 is rotatably arranged in the receiving cavity 120*a*, and the driving mechanism 300 is provided in the first housing 110**.

In this way, the opening cover 122 and the main body 121 are separated or rotated relative to each other to open the receiving cavity **120*a*, so as to replace and adapt to different clamping mechanisms 200. Different clamping mechanisms 200 are configured to adapt to operating rods 11** with different specifications, so that the shutter controller can be adapted to shutters of various specifications.

Specifically, the first housing 110 and the second housing 120 may be integrally formed, that is, the first housing 110 and the second housing 120 are different portions of the same controller housing 60. Alternatively, the first housing 110 and the second housing 120 may also be separate components, that is, the first housing 110 and the second housing 120 are components formed independently.

Further, the clamping mechanism 200 is detachably mounted in the receiving cavity **120*a*, so that the user can quickly replace or maintain the clamping mechanism 200 in the receiving cavity 120*a***.

In this embodiment, the main body 121 and the first housing 110 are integrally formed, which has good integrity and high mechanical strength. In other embodiments, the main body 121 and the first housing 110 may also be separate components.

According to some embodiments, the main body 121 and the opening cover 122 are separate components and are rotatably connected. Specifically, in an embodiment, referring to FIG. 2 and FIG. 3, one end of the opening cover 122 is rotatably connected to one end of the main body 121, and the other end of the opening cover 122 is engaged with the other end of the main body 121 by locking components 131, 132. The locking components 131, 132 include a first locking portion 131 provided on the opening cover 122 and a second locking portion 132 provided on the main body 121. When the first locking portion 131 and the second locking portion 132 are engaged, the main body 121 and the opening cover 122 are engaged. When the first locking portion 131 is disengaged from the second locking portion 132, the opening cover 122 is rotatable relative to the main body 121 to expose the receiving cavity 120*a*. In this way, through the cooperation of the first locking portion 131 and the second locking portion 132, the receiving cavity 120*a* can be switched between an open state and a closed state, and the operation is convenient.

Figure 3:
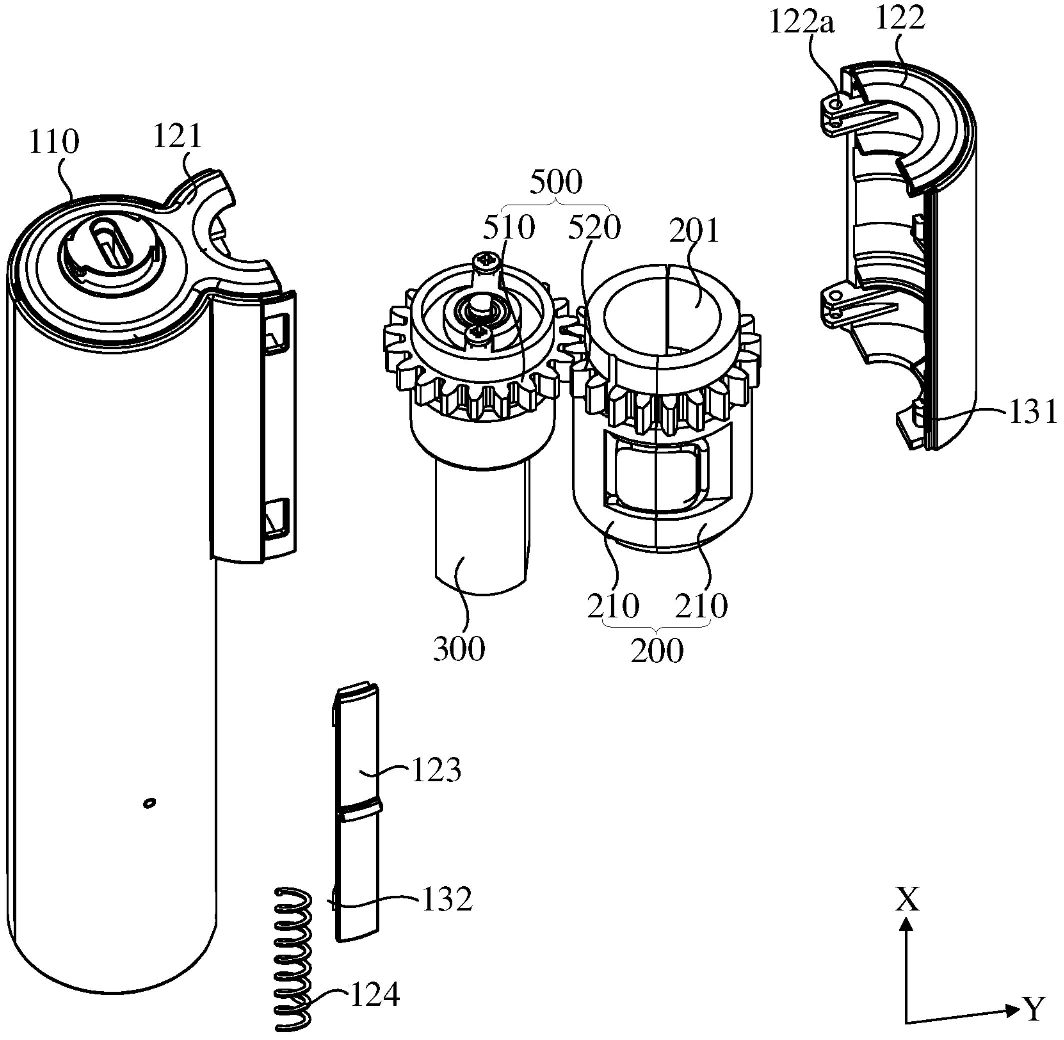
FIG. 3 is a partial exploded view of the shutter controller shown in FIG. 2.
Figure 5:
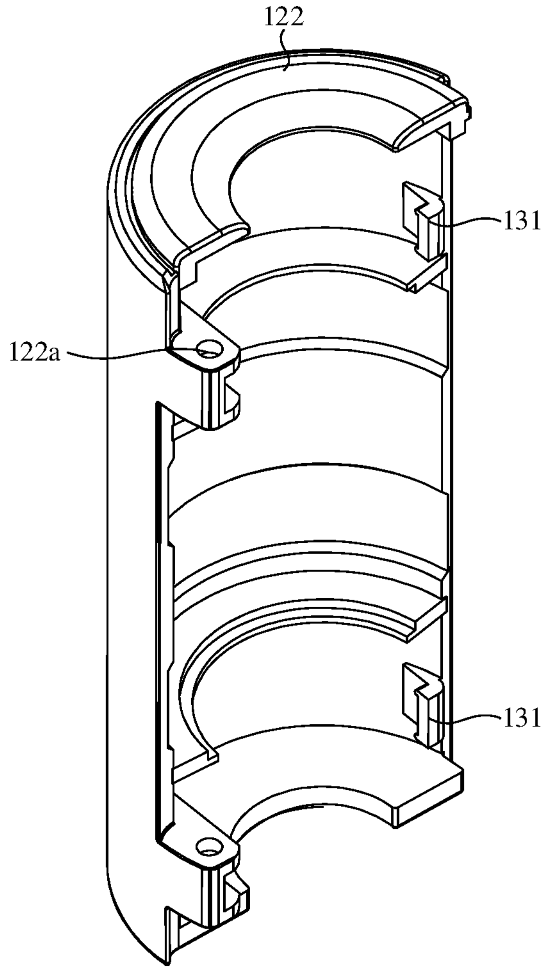
FIG. 5 is a perspective view of an opening cover shown in FIG. 3.

In this embodiment, referring to FIG. 3 and FIG. 5, one of the opening cover 122 and the main body 121 is provided with a rotating shaft, and the other one of the opening cover 122 and the main body 121 is provided with a rotating hole 122*a*. The rotating shaft is rotatably provided in the rotating hole 122*a*, so that one end of the opening cover 122 is rotatably connected to one end of the main body 121. In other embodiments, the opening cover 122 and the main body 121 may also be rotatably connected by a hinge.

Further, referring to FIG. 3, the second housing 120 further includes a locking plate 123, the second locking portion 132 is provided on the locking plate 123. The locking plate 123 is movably provided on the main body 121, and is configured to engage or disengage the first locking portion 131 and the second locking portion 132.

In this way, by moving the locking plate 123 along the main body 121, the first locking portion 131 and the second locking portion 132 can be engaged or disengaged from each other, so as to facilitate the engagement or disengagement of the first locking portion 131 and the second locking portion 132. Alternatively, the locking plate 123 provided on the second housing 120 may include the first locking portion 131 and the locking plate 123 is movably provided on the opening cover 122, and is configured to engage or disengage the first locking portion 131 and the second locking portion 132.

In this embodiment, a moving direction of the locking plate 123 is perpendicular to an opening direction of the opening cover 122. For example, the locking plate 123 can move up and down, and the opening cover 122 can be opened along a left-right direction, so that the moving direction of the locking plate 123 and the opening direction of the opening cover 122 are more reasonable configured and the controls are smoother.

For example, when the locking plate 123 provided on the second housing 120 includes the second locking portion 132, the locking plate 123 is movably provided on the main body 121, and the first locking portion 131 is provided on the opening cover 122. When the first locking portion 131 and the second locking portion 132 are switched from engagement to disengagement, moving the locking plate 123 up relative to the main body 121 will drive the second locking portion 132 to move up. At this time, the locking portion 132 can be disengaged from the first locking portion 131. Then moving the locking plate 123 down will drive the second locking portion 132 to move down. At this time, the second locking portion 132 can engage with the first locking portion 131, and the first locking portion 131 and the second locking portion 132 can be switched again from disengagement to engagement.

In other embodiments, both the first locking portion 131 and the second locking portion 132 are provided with a buckle, respectively. When the first locking portion 131 is engaged with the second locking portion 132, the two buckles are engaged. When the first locking portion 131 is disengaged from the second locking portion 132, the two buckles are separated.

In this embodiment, the number of buckles is not limited to two. When the first locking portion includes at least two buckles or the second locking portion 132 includes at least two buckles, the buckles can be arranged side by side spaced apart in a vertical direction. The number of buckles is not limited hereto.

In this embodiment, the two buckles are in shape of hooks, and are engaged with each other. In other embodiments, the buckles may also have other shapes, which are not limited hereto.

In other embodiments, one of the first locking portion 131 and the second locking portion 132 is a slot, and the other of the first locking portion 131 and the second locking portion 132 is a buckle. When the first locking portion 131 is engaged with the second locking portion 132, the buckle is held in the slot. When the first locking portion 131 is disengaged from the second locking portion 132, the buckle is disengaged from the slot.

In this embodiment, the number of buckles and slots is not limited to one. When at least two buckles and at least two slots are provided, each buckle and slot can be arranged side by side spaced apart along the vertical direction. The numbers of buckles and slots are not limited hereto.

In this embodiment, the buckle is in a shape of a rectangular block, and the slot is also in a shape of a rectangle to cooperate with the buckle. Alternatively, the buckle may also be in a circular block or other shapes, and the slot may also be in a circular or other shapes. The shapes of the buckle and the slot are not limited hereto.

In this embodiment, the locking plate 123 may be in a shape of a strip, a circle or other shapes. It should be understood that the shape of the locking plate 123 is not limited hereto.

Furthermore, referring to FIG. 3, the second housing 120 further includes an elastic member 124 provided between the locking plate 123 and the main body 121 or between the locking plate 123 and the opening cover 122. The elastic member 124 is configured to reset the locking plate 123 after the second locking portion 132 and the first locking portion 131 are engaged or disengaged.

For example, when the locking plate 123 provided on the second housing 120 includes the second locking portion 132, the locking plate 123 is movably provided on the main body 121. The first locking portion 131 is provided on the opening cover 122, and the elastic member 124 is provided between the locking plate 123 and the main body 121 to reset the locking plate 123.

In an embodiment, the elastic member 124 is a spring. For example, in an embodiment, the elastic member 124 is a compression spring. When the first locking portion 131 is engaged with the second locking portion 132, the elastic member 124 is in a slightly compressed state or a normal state. When the locking portion 131 and the second locking portion 132 are switched from engagement to disengagement (for example, when the second housing 120 needs to be opened), the locking plate 123 can be driven manually to move up relative to the main body 121, which will drive the second locking portion 132 to move up, at this time, the second locking portion 132 can be disengaged from the first locking portion 131, and the elastic member 124 is further compressed. After the locking plate 123 is released, the locking plate 123 is automatically reset by the resilience of the elastic member 124 to avoid the need for manual resetting or loosening of the locking plate 123.

In another embodiment, the elastic member 124 is a tension spring. When the first locking portion 131 is engaged with the second locking portion 132, the elastic member 124 is in a slightly stretched state or a normal state. When the locking plate 123 is driven manually to move up relative to the main body 121, the elastic member 124 is stretched. After the locking plate 123 is released, the locking plate 123 is automatically reset by the resilience of the elastic member 124.

Figure 6:
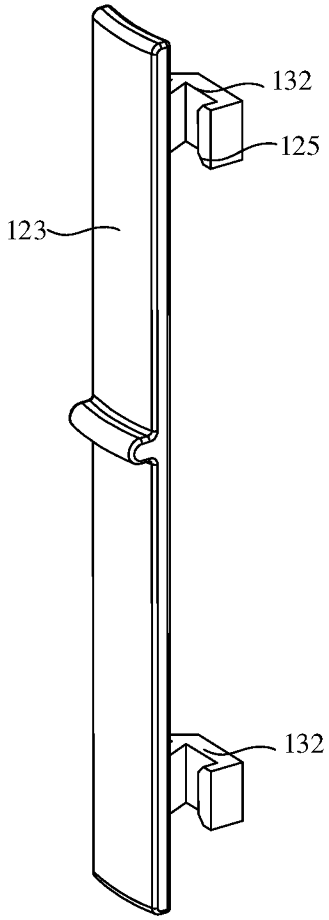
FIG. 6 is a perspective view of a locking plate shown in FIG. 3.

Furthermore, referring to FIG. 3 and FIG. 6, the first locking portion 131 or the second locking portion 132 includes a guiding surface 125, and the guiding surface 125 is configured to guide the first locking portion 131 to be engaged with the second locking portion 132.

In this embodiment, the guiding surface 125 is an inclined surface, which can play a guiding role during the locking or unlocking process of the first locking portion 131 and the second locking portion 132, so as to facilitate quick engagement or disengagement.

In another embodiment, referring to FIG. 1, the opening cover 122 is provided on the main body 121, and the opening cover 122 can move relatively to the main body 121 to open or close the receiving cavity 120*a*. In this way, when the opening cover 122 covers the main body 121, the receiving cavity 120*a* is in a closed state. When the opening cover 122 is removed from the main body 121, the receiving cavity 120*a* is in an open state. In this embodiment, when the opening cover 122 covers the main body 121, the opening cover 122 and the main body 121 are interference fit to close the receiving cavity 120*a*.

Figure 7:
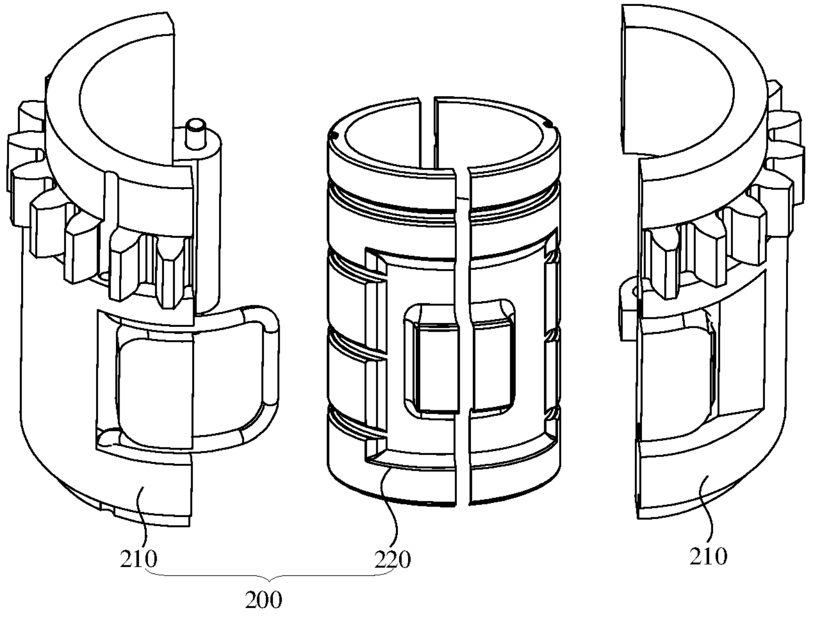
FIG. 7 is an exploded view of a clamping mechanism shown in FIG. 3.

Specifically, referring to FIG. 3 and FIG. 7, the clamping mechanism 200 includes at least two clamping portions 210 mounted in the receiving cavity 120*a*, and the clamping portions 210 cooperatively clamp the operating rod 11. The shapes of all clamping portions 210 may be the same or different. For example, all the clamping portions 210 may be in at least one shape of strip shape, semi-cylindrical shape or wave shape. The shape of the clamping portion 210 is not limited hereto.

Referring to FIG. 7, at least one clamping portion 210 is movable or rotatable to release the operating rod 11 from the clamping mechanism 200. In this way, the clamping mechanism 200 can adapt to different operating rods 11 and is convenient for quick disassembly and assembly.

When one clamping portion 210 is rotatable, the clamping portion 210 includes a rotating shaft, and another clamping portion 210 is provided with a rotating groove. The rotating shaft is rotatably arranged in the rotating groove and the rotating shaft is detachable from the rotating groove, so that an end of one clamping portion 210 is rotatably connected to an end of the another clamping portion 210 and the assembly of the clamping portion 210 is facilitated. The description that at least one clamping portion 210 is movable or rotatable can be understood as only one clamping portion 210 is movable or rotatable, or at least two clamping portions 210 are movable or rotatable.

Specifically, referring to FIG. 7, the clamping mechanism 200 is provided with a clamping cavity 201 configured to allow the operating rod 11 to extend through. The clamping mechanism 200 further includes a bushing 220, which is detachably provided in the clamping cavity 201 and is fixed on a periphery of the operating rod 11. The bushing 220 can be an integral or split structure.

In this way, by replacing the bushing 220 of different thickness, the operating rod 11 of different specifications (different diameters) can be fitted, so that the clamping mechanism 200 does not need to be replaced, which saves cost. In other embodiments, the bushing 220 can be omitted, as long as the detachably connected clamping mechanism 200 can be directly replaced to match the operation rod of different specifications.

In an embodiment, the bushing 220 may be detachably arranged in the clamping cavity 201 by plugging or clipping. The bushing 220 may be made of plastic material to increase a friction between the bushing 220 and the operating rod 11, so as to prevent the operating rod 11 detaching from the clamping cavity 201 during rotation.

Figure 8:
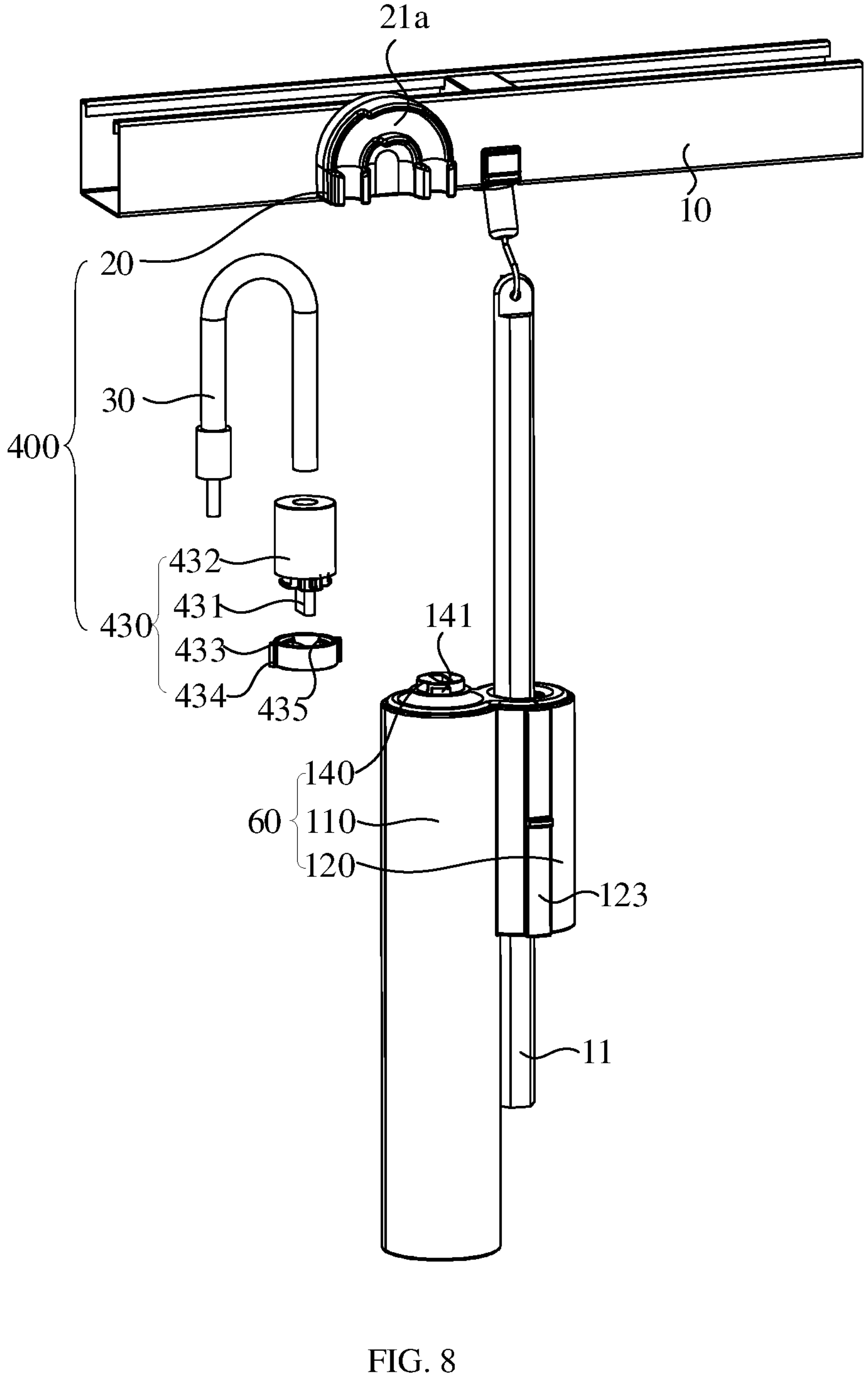
FIG. 8 is an exploded view of the shutter controller shown in FIG. 1.
Figure 9:
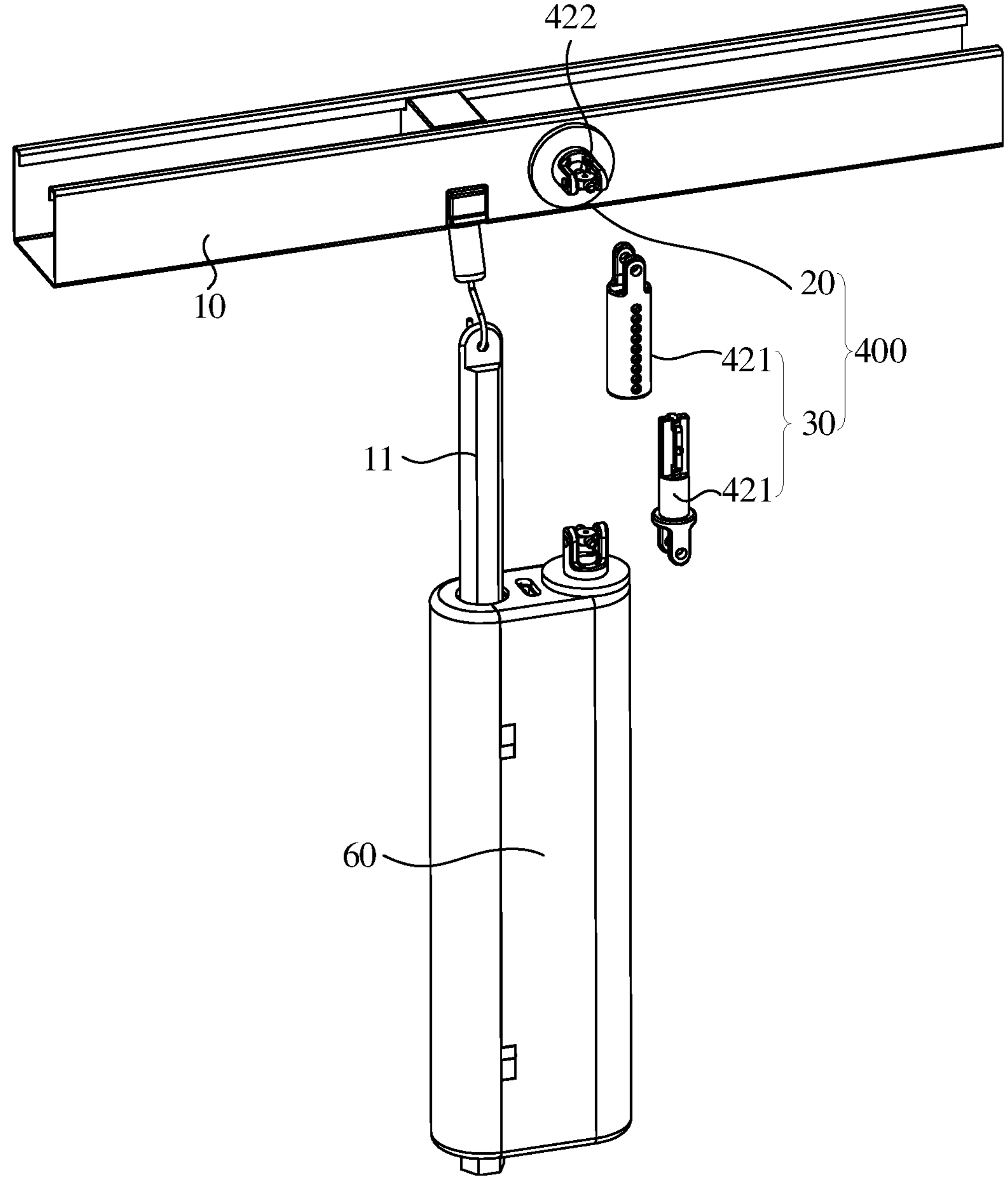
FIG. 9 is a partial exploded view of a shutter controller according to another embodiment of the present disclosure.

Referring to FIG. 8 and FIG. 9, the connecting member 30 is an integral or split structure with adjustable length, so that a distance between the controller housing 60 and the mounting base 20 in a height direction can be adjusted.

It should be understood that when the clamping mechanism 200 needs to be provided at different height positions of the operating rod 11, a distance between the shutter controller and the curtain rod 10 in the height direction should be adjustable. By providing the connecting member 30 with adjustable length, the length of the connecting member 30 in the height direction can be adjusted, so that the distance between the controller housing 60 and the mounting base 20 in the height direction can be adjusted.

For example, referring to FIG. 9, the connecting member 30 includes a plurality of connecting rods 421 that are inserted into each other. One of the connecting rods 421 is provided with a plurality of insertion holes in the height direction. An insertion block on the adjacent connecting rod 421 is inserted in one of the insertion holes, and a length of the connecting rod 421 in the height direction is adjusted by adapting to the insertion holes of different heights.

In an embodiment, referring to FIG. 9, the connecting member 30 is movably connected to the mounting base 20 and/or the controller housing 60, so that the connecting member 30 is deflected in a vertical direction.

Specifically, the vertical direction is also the height direction. The mounting base 20 and the controller housing 60 are equipped with a universal wheel 422, and the connecting member 30 is connected to the universal wheel 422. When pulling and rotating the operating rod 11 in a direction inclined to the vertical direction, the connecting member 30 can be deflected in the vertical direction through the universal wheel 422.

In another embodiment, referring to FIG. 8, the connecting member 30 is detachably connected to the mounting base 20 and/or the controller housing 60, and the connecting member 30 is an integral structure, such as a hose, a soft rope, a metal bellows, a snake bone tube and other soft connecting bodies. Specifically, the mounting base 20 is provided with a semi-circular or other shaped mounting groove 21*a*, and the flexible connecting member 30 can be embedded in the mounting groove 21*a* and form a tight fit. When the height needs to be adjusted, the flexible connecting body can be manually pulled up and down to achieve a tight fit at another position.

Referring to FIG. 8, the mounting mechanism 400 further includes a first connection assembly 430 connected to an end of the connecting member 30 adjacent to the controller housing 60. The controller housing 60 further includes a second connection assembly 140. The first connection assembly 430 is detachably connected to the second connection assembly 140.

Specifically, referring to FIG. 1, an interior of the connecting member 30 is provided with a wire configured to be connected to a solar panel. An interior of the first connection assembly 430 is provided with a first connector 431, and an interior of the second connection assembly 140 is provided with a second connector. The wire is electrically connected to the first connector 431, the first connector 431 is electrically connected to the second connector, and the second connector is electrically connected to the driving mechanism 300. In this way, the solar panel is electrically connected to the driving mechanism 300 through the wire, the first connector 431 and the second connector, so that the driving mechanism 300 can be powered by the solar panel.

Specifically, the first connector 431 and the second connector can be plugged into and separated from each other. When the first connector 431 and the second connector are plugged into each other, the first connector 431 is electrically connected to the second connector. When the first connector 431 is separated from the second connector, the first connector 431 is electrically disconnected from the second connector.

More specifically, referring to FIG. 8, the first connecting assembly 430 includes a connecting portion 432 and a rotating portion 433 that are movably connected. The rotating portion 433 is connected to the second connection assembly 140. The second connection assembly 140 includes a first positioning portion 141, and the rotating portion 433 includes a second positioning portion 435. When the first connecting assembly 430 is connected to the second connection assembly 140, the rotating portion 433 is rotated, and the second positioning portion 435 and the first positioning portion 141 can cooperate with each other for positioning.

In this embodiment, the first positioning portion 141 is a positioning groove, and the second positioning portion 435 is a positioning block. In other embodiments, the first positioning portion 141 can be a positioning block, and the second positioning portion 435 can be a positioning groove. Alternatively, both the first positioning portion 141 and the second positioning portion 435 are positioning blocks. The first positioning portion 141 and the second positioning portion 435 are configured to position the rotating portion 433 on the second connection assembly 140.

Specifically, the number of the first positioning portion 141 and the second positioning portion 435 is not limited to one, that is, at least two first positioning portion 141 and at least two second positioning portion 435 may be provided. When at least two first positioning portion 141 and at least two second positioning portion 435 are provided, the first positioning portion 141 and the second positioning portion 435 may be evenly distributed along a circumferential direction.

Referring to FIG. 8, an outer side of the rotating portion 433 is provided with at least one knob 434, and the rotating portion 433 can be driven to rotate by rotating the knob 434.

In an embodiment, the knob 434 and the rotating portion 433 can be integrally formed, which has good integrity and high mechanical strength. Alternatively, the knob 434 and the rotating portion 433 may also be a split structure, and the knob 434 is detachably connected to the rotating portion 433.

Figure 4:
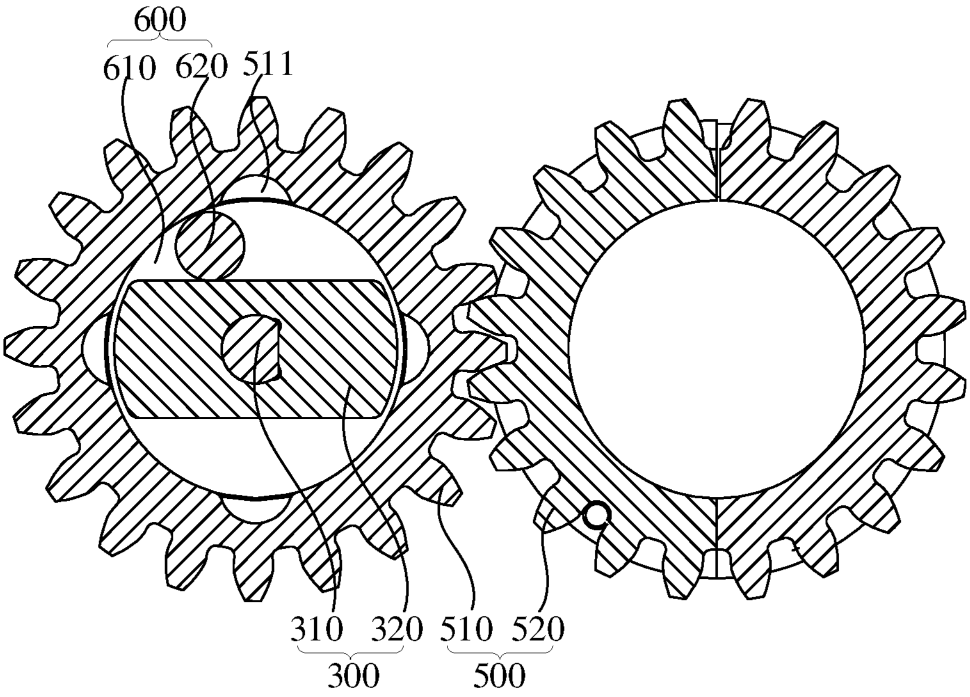
FIG. 4 is a cross-sectional view of a transmission mechanism and a clutch mechanism.

Referring to FIG. 3 and FIG. 4, the shutter controller also includes a transmission mechanism 500 and a clutch mechanism 600. The transmission mechanism 500 is connected to the clamping mechanism 200 and the driving mechanism 300, and the clutch mechanism 600 can be connected to or separated from the transmission mechanism 500.

In the embodiment, the clutch mechanism 600 is mounted inside the first housing 110 of the controller housing 60.

Specifically, when the clutch mechanism 600 is in an engaged state, an output power of the driving mechanism 300 is transmitted to the transmission mechanism 500 through the clutch mechanism 600, and the transmission mechanism 500 drives the clamping mechanism 200 to rotate, thereby driving the operating rod 11 to rotate. When the clutch mechanism 600 is in a disengaged state, the clutch mechanism 600 is disengaged from the transmission mechanism 500, and the operating rod 11 is capable of rotating manually. In this way, the shutter can be opened and closed electrically through the shutter controller, and the shutter can also be opened and closed manually, taking into account the integrated design requirements of electric and manual opening and closing of the shutter.

For example, when the shutter needs to be opened and closed electrically, the clutch mechanism 600 is in the engaged state, the clamping mechanism 200 can be driven to rotate by the driving mechanism 300, the clutch mechanism 600 and the transmission mechanism 500. When the shutter needs to be opened and closed manually, the clutch mechanism 600 can be switched to the disengaged state.

Referring to FIG. 4, the transmission mechanism 500 includes a driving wheel 510 and a driven wheel 520 that are engaged with each other. The clutch mechanism 600 is located in the driving wheel 510, the driven wheel 520 is fixed or integrally formed on the clamping mechanism 200, and the driving wheel 510 is connected to the driving mechanism 300.

In this embodiment, when the driven wheel 520 is integrally formed on the clamping mechanism 200, an end of the clamping mechanism 200 can be used as the driven wheel 510 to be engaged with the driving wheel 520. In other embodiments, both ends of the clamping mechanism 200 can be used as the driven wheel 510 to be engaged with the driving wheel 520, so that the clamping mechanism 200 can be mounted in the receiving cavity 120*a* of the second housing 120 conveniently.

Driven by the driving mechanism 300, the driving wheel 510 rotates around a first direction or a second direction of the controller housing 60, and the driven wheel 520 rotates around the first direction of the controller housing 60. The first direction is perpendicular to or inclined to the second direction.

Figure 10:
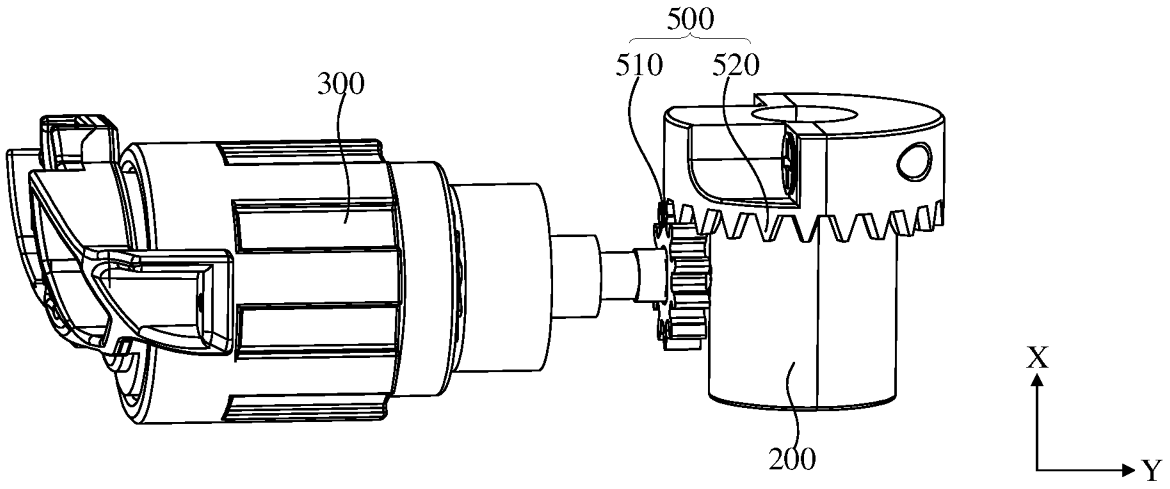
FIG. 10 is a perspective view of the transmission mechanism according to another embodiment.

In an embodiment, referring to FIG. 3 and FIG. 4, when the driving wheel 510 and the driven wheel 520 rotate around the first direction, the driving wheel 510 and the driven wheel 520 are engaged laterally. Referring to FIG. 10, when the driving wheel 510 rotates around the second direction and the driven wheel 520 rotates around the first direction, the driving wheel 510 and the driven wheel 520 are engaged longitudinally.

It should be noted that the first direction is an axial direction of the operating rod 11, that is, the X direction shown in FIG. 3. The second direction is the Y direction shown in FIG. 3.

Specifically, referring to FIG. 3 and FIG. 10, an axis of the driving wheel 510 is perpendicular or parallel to an axis of the driven wheel 520.

Referring to FIG. 4, the clutch mechanism 600 includes an attraction plate 610 and a movable block 620. The attraction plate 610 is mounted in the driving wheel 510. The movable block 620 is movable in the driving wheel 510 and can be magnetically attracted to the attraction plate 610. The driving mechanism 300 includes a driving member 310 and a swinging member 320 connected to each other. An interior of the driving wheel 510 is provided with a limiting groove 511 along a radial direction thereof.

When the clutch mechanism 600 is in the engaged state, the driving member 310 drives the swing member 320 to rotate, and the swing member 320 pushes the movable block 620 to move and is latched in the limiting groove 511, and then continues to push the movable block 620 to drive the driving wheel 510 to rotate, and drives the driven wheel 520 and the clamping mechanism 200 to rotate to drive the operating rod 11 to rotate. When the clutch mechanism 600 is in the disengaged state, the movable block 620 is disengaged from the limiting groove 511, and the operating rod 11 is rotated manually.

It should be understood that the driving mechanism 300 is configured to drive the swing member 320 to rotate, and the swing member 320 is configured to push the movable block 620 into the limiting groove 511 during rotating. The limiting groove 511 is configured so that the movable block 620 can be disengaged from the limiting groove 511 when the swing member 320 does not push the movable block 620 and the driving wheel 510 rotates under an action of an external force. Specifically, a depth of the limiting groove 511 is less than a radial dimension of the movable block 620, the movable block 620 is cylindrical, and a groove wall of the limiting groove 511 is arc-shaped.

When the clutch mechanism 600 is in the engaged state, referring to FIG. 4 and FIG. 3, the driving mechanism 300 drives the swing member 320 to rotate, the swing member 320 pushes the movable block 620 to move. The thrust of the swing member 320 enable the movable block 620 to overcome the attraction force of the attraction plate 610 to push the movable block 620 to be latched in the limiting groove 511, then the swinging member 320 continues to push the movable block 620 to drive the driving wheel 510 to rotate, and drive the driven wheel 520 and the clamping mechanism 200 to rotate, thereby realizing the electric control of the shutter.

Referring to FIG. 3 and FIG. 4, when the clutch mechanism 600 is in the disengaged state, the operating rod 11 is rotated manually. At this time, the rotation of the operating rod 11 will drive the clamping mechanism 200 to rotate, and the clamping mechanism 200 will drive the driven wheel 520 and the driving wheel 510 to rotate. The movable block 620 will not be pressed in the limiting groove 511 without being pushed by the swing member 320. As the driving wheel 510 continues to rotate, the groove wall of the limiting groove 511 pushes the movable block 620, and the movable block 620 is subjected to the attraction force of the attraction plate 610, that is, a resistance from the attraction plate 610, so that with the movement of the driving wheel 510, the movable block 620 moves toward an opening of the limiting groove 511 along the arc-shaped groove wall of the limiting groove 511. Since the depth of the limiting groove 511 is less than the radial dimension of the movable block 620, the movable block 620 can be pushed out of the limiting groove 511 by the groove wall of the limiting groove 511. The movable block 620 no longer hinders the rotation of the driving wheel 510 due to the blocking effect of the swinging member 320 on the movable block 620, so that manual operation can be achieved.

Optionally, the attraction plate 610 is an iron sheet, and the movable block 620 is a magnet. Alternatively, the attraction plate 610 is a magnet, and the movable block 620 is an iron block.

Figure 11:
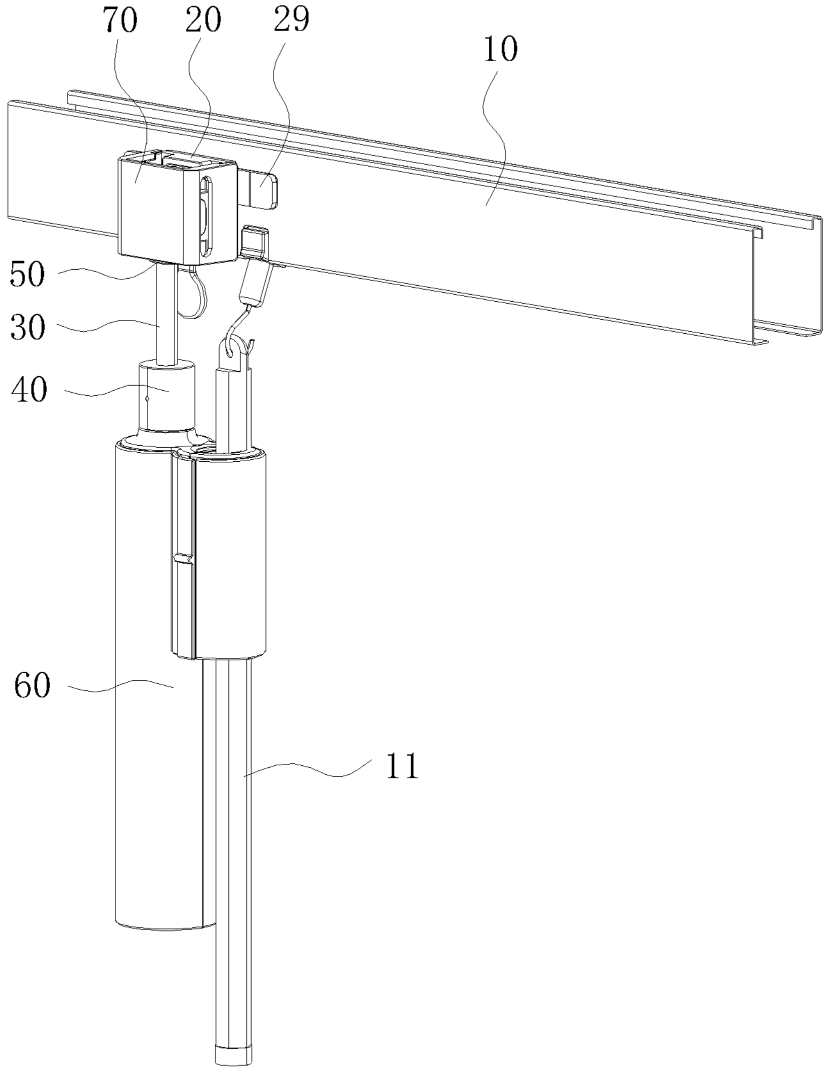
FIG. 11 is a perspective view of the shutter controller according to another embodiment of the present disclosure.
Figure 12:
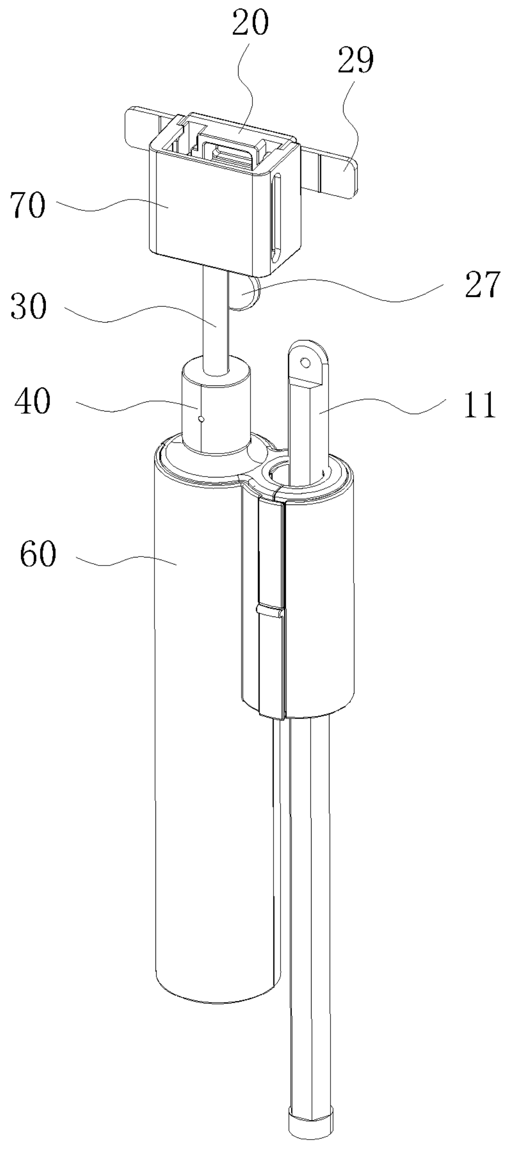
FIG. 12 is an enlarged perspective view of the shutter controller shown in FIG. 11.
Figure 13:
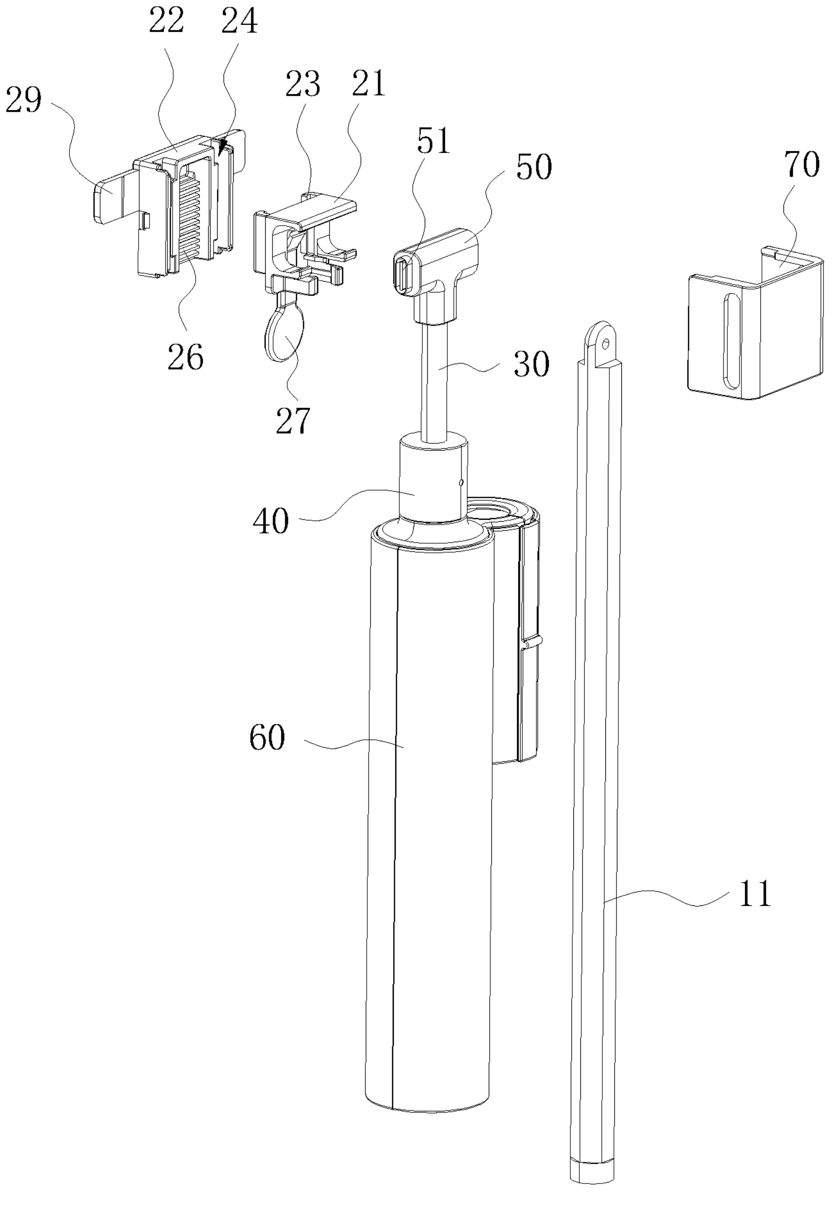
FIG. 13 is an exploded view of the shutter controller shown in FIG. 12.

In an embodiment, (i.e., Embodiment 1), as shown in FIGS. 11 to 13, a shutter controller is configured to control an opening and closing of the shutter system. It should be understood that the shutter system includes the blades (not shown), the curtain rod 10, and the operating rod 11. The operating rod 11 is hung on a hook provided on the curtain rod 10. The rotation of the operating rod 11 can drive the blades of the shutter to be opened and closed. The shutter controller controls the opening and closing of the shutter system by controlling the rotation of the operating rod 11. The curtain rod 10 is fixed to a wall or a window sill, and the blades are mounted on the curtain rod 10. The shutter controller includes the mounting base 20, the connecting member 30, and the controller housing 60.

The mounting base 20 is configured to be mounted on a fixed mounting surface, and the fixed mounting surface may be a surface of the curtain rod 10, the wall or the window sill. Optionally, the mounting base 20 may be fixed to the curtain rod 10 or the wall or the window sill by glue, screws or bolts.

A first end of the connecting member 30 is provided with a first connecting structure a second end of the connecting member 30 is provided with a second connecting structure and the second connecting structure 50 is connected to the mounting base 20. Optionally, the connecting member 30 may be a hose, a soft rope, a metal shaping tube/gooseneck tube or a snake-bone tube and other connecting bodies. The interior of the connecting member 30 is provided with a wire configured to conduct with a solar power generation assembly (for example, a solar panel) or an adapter.

The controller housing 60 is provided with a transmission mechanism (not shown), which is connected to the driving mechanism. The driving mechanism is connected to a battery, and may also be electrically connected to a wire inside the connecting member 30. The transmission mechanism is connected to the operating rod 11 and is configured to drive the operating rod 11 to rotate. The movement of the operating rod 11 drives the blades of the shutter to open and close at a certain angle. The transmission mechanism and the operating rod 11 can be connected through an intermediate member (e.g., a clamping mechanism). The controller housing 60 is fixedly connected to the first connecting structure 40, or the controller housing is integrally formed with the first connecting structure 40. The controller housing 60 and the first connecting structure 40 can be fixedly connected indirectly through fixing members such as screws or other mechanisms, or directly fixedly connected through buckles and the like.

In the embodiment, the first connecting structure 40 and the controller casing 60 are fixedly connected, or the first connecting structure 40 and the controller housing 60 are integrally formed, so that a connecting structure between the controller housing 60 is connected to the first connecting structure 40 more stably, which greatly reduces the shaking generated between the controller housing 60 and the first connecting structure 40, so that the overall stability of the shutter controller is good and the practicability is enhanced.

In this embodiment, as shown in FIG. 11 and FIG. 13, the second connecting structure 50 is movable relative to the fixed mounting surface to adjust a position of the controller housing 60 in the vertical direction. It should be understood that the second connecting structure 50 may move up and down itself or the second connecting structure 50 is driven to move by a up and down movement of a carrier (the carrier may be a portion of the mounting base 20 or an external carrier) fixed to the second connecting structure 50. Specifically, the second connecting structure 50 is slidably connected to the mounting base 20 or the carrier fixed to the second connecting structure 50 is slidably connected to the mounting base 20 to adjust the position of the controller housing 60 in the vertical direction. The second connecting structure 50 can be moved relative to the fixed mounting surface, which is convenient for adjusting the height of the controller housing 60, so that the shutter controller can cooperate with different types of shutter systems, therefore improving the adaptability, mounting fault tolerance and practicality of the shutter controller, and practicability is enhanced.

Figure 14:
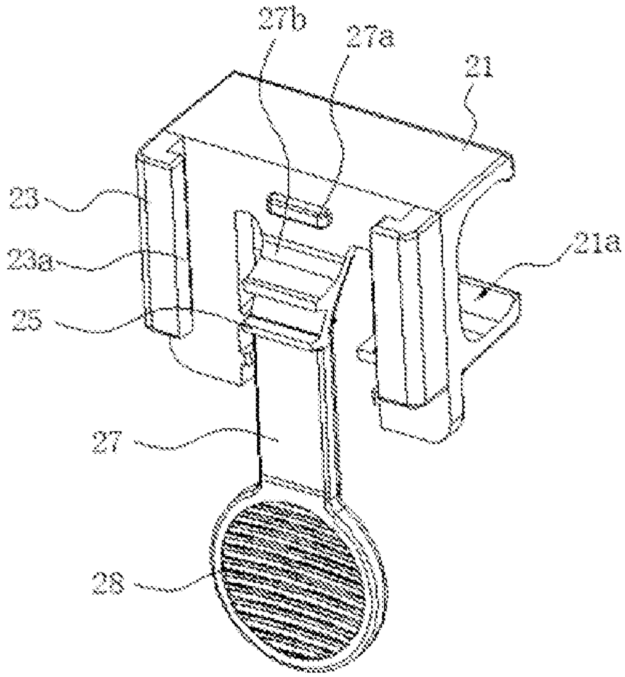
FIG. 14 is an enlarged perspective view of a first mounting base shown in FIG. 13.
Figure 15:
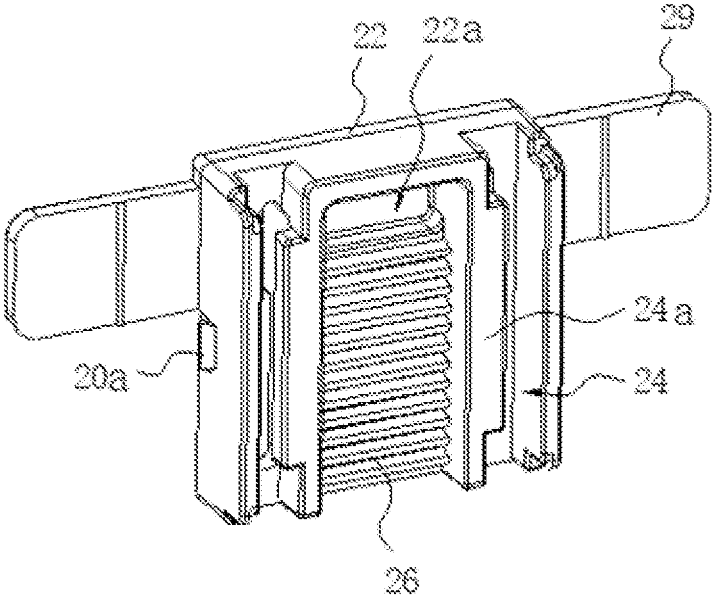
FIG. 15 is an enlarged perspective view of a second mounting base shown in FIG. 13.

Further, as shown in FIGS. 13 to 15, the mounting base 20 includes a first mounting base 21 and a second mounting base 22. The first mounting base 21 is fixedly connected to the second connecting structure 50, the first mounting base 21 is slidably connected the second mounting base 22, and the second mounting base 22 is fixedly connected to the fixed mounting surface. A position of the second connecting structure 50 is adjusted by adjusting a relative position between the first mounting base 21 and the second mounting base 22 to adjust the position of the controller housing 60.

Furthermore, a connection between the first mounting base 21 and the second mounting base 22 can be in the following manner.

A first connection method: as shown in FIGS. 13 to 15, the first mounting base 21 is provided with a first sliding block 23, and the second mounting base 22 is provided with a first sliding groove 24 extending in the vertical direction, and the first sliding block 23 is slidably received in the first sliding groove 24. In an embodiment, a tight fit may be formed between the first sliding block 23 and the first sliding groove 24 to prevent the first sliding block 23 from slipping out of the first sliding groove 24 during movement.

A second connection method: the second mounting base 22 is provided with a first sliding block, and the first mounting base 21 is provided with a first sliding groove extending in the vertical direction after being mounted. The first sliding block is slidably connected to the first sliding groove. In an embodiment, a tight fit may be formed between the first sliding block and the first sliding groove to prevent the first sliding block from easily slipping out of the first sliding groove during movement.

Furthermore, as shown in FIGS. 13 to 15, the first mounting base 21 or the second connecting structure 50 is provided with a third engaging portion 25, and the second mounting base 22 is provided with a fourth engaging portion 26. When the fourth engaging portion 26 is engaged with the third engaging portion 25, the position of the second connecting structure 50 is fixed.

Furthermore, the shutter controller further includes a pressing member 27. The pressing member 27 is connected to the first mounting base 21 or the second connecting structure 50. The pressing member 27 is pressed to disengage third engaging portion 25 from the fourth engaging portion 26, so that the second connecting structure 50 can move relative to the fixed mounting surface. It should be understood that, the pressing member 27 and the first mounting base 21 or the second connecting structure 50 may be fixedly connected, integrally formed or connected through other indirect connection members.

Specifically, as shown in FIG. 14, the pressing member 27 is capable of swinging back and forth. The third engaging portion 25 is arranged on the pressing member 27, and the pressing member 27 extends outward to form a pressing portion 28. The pressing portion 28 is pressed to separate the third engaging portion 25 from the fourth engaging portion 26.

Specifically, as shown in FIG. 14, a first end of the pressing member 27 is provided with an elastic connecting portion **27*b* connected to the first mounting base 21 or the second connecting structure 50, and a second end of the pressing member 27 extends outward to form a pressing portion 28 to facilitate pressing. The pressing member 27 can swing between a first position and a second position by pressing the pressing portion 28. When the pressing member 27 is located at the first position, the third engaging portion 25 is engaged with the fourth engaging portion 26. At this time, the pressing portion 28 of the pressing member 27 is pressed, the elastic connecting portion 27*b* of the pressing member 27 is elastically deformed. The pressing member 27 swings from the first position to the second position, the third engaging portion 25 is separated from the fourth engaging portion 26, the fixing to the third engaging portion 25 is released. The pressing portion 28 of the pressing member 27 is released, and the elastic connecting portion 27*b* of the pressing member 27 is restored to an initial shape, so that the third engaging portion 25 and the fourth engaging portion 26** are engaged again.

Specifically, as shown in FIGS. 13 to 15, the pressing member 27 is provided on the first mounting base 21, and the pressing member 27 and the first mounting base 21 are integrally formed. The first mounting base 21 has a front side and a rear side. The front side of the first mounting base 21 is provided with the mounting groove **21*a*, and the second connecting structure 50 is mounted in the mounting groove 21*a*. The second mounting base 22 has a front side and a rear side, the front side of the second mounting base 22 is opposite to the rear side of the first mounting base 21. The front side of the second mounting base 22 is provided with an accommodating groove 22*a* configured to accommodate the third engaging portion 25. When the first mounting base 21 and the second mounting base 22 slide relative to each other, the third engaging portion 25 slides in the accommodating groove 22*a*, and the fourth engaging portion 26 is arranged in the accommodating groove 22*a* provided on the front side of the second mounting base 22. When the first mounting base 21 and the second mounting base 22 are relatively fixed, the third engaging portion 25 and the fourth engaging portion 26** are engaged with each other.

Specifically, two first sliding grooves 24 are arranged on the front side of the second mounting base 22, and the two first sliding grooves 24 are distributed on both sides of the accommodating groove **22*a* of the second mounting base 22. Two first sliding blocks 23 are provided on the rear side of the first mounting base 21. The first sliding block 23 is adapted to the first sliding groove 24, and the two first sliding blocks 23 are slidably connected to the two first sliding groove 24, respectively, so that the first mounting base 21** slides more smoothly.

More specifically, a side wall of the first sliding groove 24 is provided with a first positioning convex edge **24*a*, a side wall of the first sliding block 23 is provided with a second positioning convex edge 23*a* cooperating with the first positioning convex edge 24*a*. When the first sliding block 23 is placed in the first sliding groove 24, the second positioning convex edge 23*a* is simultaneously placed in the first sliding groove 24. The first positioning convex edge 24*a* is configured to abut against the second positioning convex edge 23*a*, so that the second positioning convex edge 23*a* is kept in the first sliding groove 24, and then the first mounting base 21 is limited, so as to prevent the first mounting base 21 from disengaging from the second mounting base 22** during the sliding process.

More specifically, the pressing member 27 is provided with a limiting strip 27*a*. When the third engaging portion 25 on the pressing member 27 slides in the accommodating groove 22*a* of the second mounting base 22, after the limiting strip 27*a* is in contact with an inner surface of the receiving groove 22*a*, the pressing member 27 cannot continue to move along the vertical direction, so that the first mounting base 21 and the second mounting base 22 can slide relative to each other within a preset range.

Specifically, the third engaging portion 25 is provided with a rack, and the fourth engaging portion 26 is provided with a strip-shaped wedge block configured to be engaged with the rack. Alternatively, the third engaging portion 25 is provided with the strip-shaped wedge block, and the fourth engaging portion 26 is provided with the rack configured to be engaged with the strip-shaped wedge block. A shape of the strip-shaped wedge is adapted to the rack, and the strip-shaped wedge is engaged in a groove formed between adjacent two teeth of the rack. The strip-shaped wedge is engaged at different positions of the rack, so that the first mounting base 21 or the second connecting structure 50 can be fixed at different positions, and the height of the controller housing 60 can be adjusted, so as to adapt to different types of shutter systems.

Figure 17:
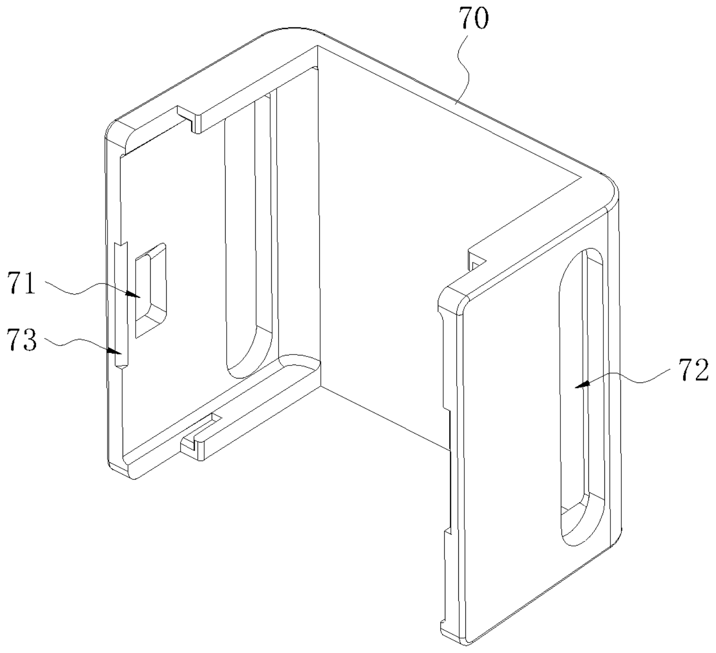
FIG. 17 is a perspective view of a cover plate shown in FIG. 13.

In this embodiment, as shown in FIG. 17, the shutter controller further includes a cover plate 70 provided an outer side the second connecting structure 50. The cover plate 70 is connected to the mounting base 20 to place the second connecting structure 50 between the cover plate 70 and the mounting base 20. The cover plate 70 is configured to prevent external dust from entering the mounting base 20 and protect the mounting base 20, thereby improving cleanliness.

Specifically, as shown in FIG. 11, FIG. 13, and FIG. 17, two ends of the cover plate are bent to form a U-shaped structure, and the two ends of the cover plate 70 are provided with slots 71. Two ends of the mounting base 20 are provided with buckles 20*a*, and the buckles are engaged with the slots 71, respectively, to fix the cover plate 70 to the mounting base Edges of the two ends of the cover plate 70 are provided with inclined surfaces 73, so that the buckle 20*a* located on the mounting base 20 slides over the inclined surfaces 73 and then snaps into the slot 71. By providing the inclined surfaces 73, the wear of the buckle 20*a* to the cover plate 70 can be reduced, and at the same time, the buckle 20*a* can be more easily snapped into the slot 71. In other embodiments, buckles are provided at two ends of the cover plate 70, and slots are provided at two ends of the mounting base 20, and the buckles engage with the slots to fix the cover plate 70 to the mounting base 20.

In this embodiment, one side or opposite sides of the cover plate 70 are provided with a through groove 72, and a connecting structure of the solar power generation assembly or the adapter can extend into an inner side of the cover plate 70 through the through groove 72 and then be electrically connected to the second connecting structure 50. It is convenient for the solar power generation assembly or the adapter to charge the shutter controller through the second connecting structure 50.

Specifically, as shown in FIG. 13, a lower end of the second connecting structure is connected to the connecting member 30. An upper end of the second connecting structure extends to both sides to form two fixing portions, so that the second connecting structure 50 has a T-shaped structure as a whole. In other embodiments, the second connecting structure 50 may also be L-shaped or X-shaped. A wire is mounted in a middle of the second connecting structure 50.

In this embodiment, the second connecting structure 50 is provided with a third connector 51 configured to be electrically connected to the solar power generation assembly (not shown) or the adapter. The third connector 51 is provided on one of the fixing portions of the second connecting structure 50 and is provided towards the through groove 72 of the cover plate 70. The third connector 51 is electrically connected to a rechargeable battery through a wire. The rechargeable battery is arranged in the controller housing 60 and is electrically connected to the driving mechanism. The driving mechanism is arranged in the controller housing 60 and is electrically connected to the transmission mechanism. The driving mechanism is configured to drive the transmission mechanism to move. The driving mechanism may be a motor, and the transmission mechanism transmits the power of the driving mechanism to the operating rod 11. Since the third connector 51 is added, the shutter controller can be plugged and charged freely through the solar power generation assembly or the adapter, and the charging process is convenient.

Figure 16:
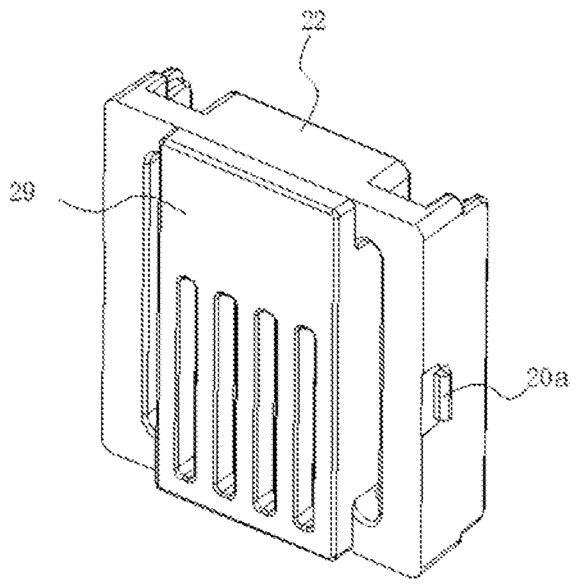
FIG. 16 is a perspective view of the second mounting base according to another embodiment of the present disclosure.

In this embodiment, as shown in FIG. 15 and FIG. 16, the rear side of the mounting base 20 is provided with a mounting plate 29 configured to fix the curtain rod 10, and two ends of the mounting plate 29 are located on an inner side of an outer edge of the mounting base 20 or the two ends of the mounting plate 20 extend outward beyond the outer edge of the mounting plate 29. The mounting plate 29 may be fixed to the curtain rod 10 by glue, double-sided tape, or screws. It should be understood that the mounting plate 29 may have two structures. As shown in FIG. 16, in this embodiment, two ends of the mounting plate 29 are located on the inner side of the outer edge of the mounting base 20. As shown in FIG. 15, in this embodiment, two ends of the mounting plate 20 extend outward beyond the outer edge of the mounting plate 29. Mounting plates 29 of different structures are suitable for different mounting scenarios. If there is no need to avoid other components on the curtain rod 10, the mounting plate 29 with the structure shown in FIG. 16 can be selected. In that case, the whole mounting base 20 is fixed on the curtain rod 10, the mounting structure is more stable. If it is necessary to avoid other components, the mounting plate 29 with the structure shown in FIG. 15 can be selected. In that case, only the upper end of the mounting base 20 is fixed on the curtain rod 10. A surface of the mounting plate 29 is parallel to the front side of the mounting base 20 or forms an oblique angle with the front side of the mounting base 20. When the surface of the mounting plate 29 and the front side of the mounting base 20 form an oblique angle, the mounting base 20 will slightly tilt up after being mounted on the curtain rod 10, which can prevent the mounting base 20 from touching the blades of the shutter.

In another embodiment (i.e., Embodiment 2), the difference between Embodiment 2 and Embodiment 1 lies mainly in that: the second connecting structure 50 is provided with a first engaging portion, and the mounting base 20 is provided with a second engaging portion. When the second engaging portion is engaged with the first engaging portion, the position of the second connecting structure 50 is fixed.

In this embodiment, the shutter controller further includes the pressing member 27 connected to the second connecting structure 50. By pressing the pressing member 27, the first engaging portion can be moved away from the second engaging portion, so that the second connecting structure 50 can move up and down relative to the fixed mounting surface.

Specifically, the first engaging portion is provided with a rack, the second engaging portion is provided with a strip-shaped wedge block configured to be engaged with the rack. Alternatively, the first engaging portion is provided with the strip-shaped wedge block, and the second engaging portion is provided with a rack configured to be engaged with the strip-shaped wedge block. A shape of the strip-shaped wedge is adapted to the rack. The strip-shaped wedge is engaged at different positions of the rack, so that the second connecting structure can be fixed at different positions.

The structure of the rest of this embodiment is the same as that of Embodiment 1, and the features not explained in this embodiment are used as explained in Embodiment 1, and will not be repeated herein.

The above-mentioned embodiments do not constitute a limitation on the protection scope of the technical solution. Any modifications, equivalent replacements and improvements made within the spirit and principles of the above-mentioned embodiments shall be included within the protection scope of this technical solution.

The foregoing descriptions are merely specific embodiments of the present disclosure, but are not intended to limit the protection scope of the present disclosure. Any variation or replacement readily figured out by a person skilled in the art within the technical scope disclosed in the present disclosure shall all fall within the protection scope of the present disclosure.

What is claimed is:

1. A shutter controller configured to control an operating rod of a shutter, comprising:

a controller housing comprising a first housing and a second housing connected to each other, and the second housing being provided with a receiving cavity;

a clamping mechanism configured to clamp the operating rod and rotatably provided in the receiving cavity; and a driving mechanism provided in the first housing and being in transmission connection with the clamping mechanism, and the driving mechanism being configured to drive the clamping mechanism to rotate, thereby driving the operating rod to rotate;

wherein the clamping mechanism comprises at least two clamping portions configured to cooperatively clamp the operating rod, at least one of the clamping portions is movable or rotatable to release the operating rod from the clamping mechanism.

2. The shutter controller according to claim 1, wherein the clamping mechanism is detachably mounted in the receiving cavity.

3. The shutter controller according to claim 1, wherein the clamping mechanism is provided with a clamping cavity configured to allow the operating rod to extend through, the clamping mechanism further comprises a bushing, the bushing is detachably provided in the clamping cavity and is fixed on a periphery of the operating rod.

4. The shutter controller according to claim 1, further comprising:

a transmission mechanism connected to the clamping mechanism and the driving mechanism; and a clutch mechanism capable of being connected to or separated from the transmission mechanism;

wherein when the clutch mechanism is in an engaged state, an output power of the driving mechanism is transmitted to the transmission mechanism through the clutch mechanism, the transmission mechanism drives the clamping mechanism to rotate, thereby driving the operating rod to rotate, when the clutch mechanism is in a disengaged state, the clutch mechanism is disengaged from the transmission mechanism, and the operating rod is capable of rotating manually.

5. The shutter controller according to claim 1, wherein the second housing comprises a main body and an opening cover, the main body is connected to the first housing, and the opening cover is connected to the main body to form the receiving cavity.

6. The shutter controller according to claim 5, wherein one end of the opening cover is rotatably connected to one end of the main body, the other end of the opening cover is locked to the other end of the main body by locking components, the locking components comprise a first locking portion provided on the opening cover and a second locking portion provided on the main body, when the first locking portion and the second locking portion are engaged, the main body and the opening cover are locked, when the first locking portion is disengaged from the second locking portion, the opening cover is rotatable relative to the main body to expose the receiving cavity.

7. The shutter controller according to claim 6, wherein the second housing further comprises a locking plate on which the first locking portion is provided, and the locking plate is movably provided on the opening cover, and is configured to engage or disengage the first locking portion and the second locking portion.

8. The shutter controller according to claim 6, wherein the second housing further comprises a locking plate comprising the second locking portion, and the locking plate is movably provided on the main body, and is configured to engage or disengage the first locking portion and the second locking portion.

9. The shutter controller according to claim 8, wherein the first locking portion or the second locking portion comprises a guiding surface, the guiding surface is configured to guide the first locking portion to be engaged with the second locking portion, the second housing further comprises an elastic member provided between the locking plate and the main body, and the elastic member is configured to reset the locking plate after the second locking portion and the first locking portion are engaged or disengaged.

10. The shutter controller according to claim 1, further comprising:

a mounting base configured to be mounted on a fixed mounting surface; and a connecting member, a first end of the connecting member being provided with a first connecting structure, a second end of the connecting member being provided with a second connecting structure connected to the mounting base, and the controller housing being fixedly connected or integrally formed with the first connecting structure.

11. A shutter controller configured to control an operating rod of a shutter, comprising:

a controller housing comprising a first housing and a second housing connected to each other, and the second housing being provided with a receiving cavity;

a clamping mechanism configured to clamp the operating rod and rotatably provided in the receiving cavity;

a driving mechanism provided in the first housing and being in transmission connection with the clamping mechanism, and the driving mechanism being configured to drive the clamping mechanism to rotate, thereby driving the operating rod to rotate;

a mounting base configured to be mounted on a fixed mounting surface;

a connecting member, a first end of the connecting member being provided with a first connecting structure, a second end of the connecting member being provided with a second connecting structure connected to the mounting base, and the controller housing being fixedly connected or integrally formed with the first connecting structure; and a cover plate provided an outer side the second connecting structure, the cover plate being connected to the mounting base to place the second connecting structure between the cover plate and the mounting base;

wherein one side or two opposite sides of the cover plate are provided with a through groove, and the second connecting structure is connected to a solar power generation assembly or an adapter through the through groove.

12. A shutter controller configured to control an operating rod of a shutter, comprising:

a controller housing comprising a first housing and a second housing connected to each other, and the second housing being provided with a receiving cavity;

a clamping mechanism configured to clamp the operating rod and rotatably provided in the receiving cavity;

a driving mechanism provided in the first housing and being in transmission connection with the clamping mechanism, and the driving mechanism being configured to drive the clamping mechanism to rotate, thereby driving the operating rod to rotate;

a mounting base configured to be mounted on a fixed mounting surface; and a connecting member, a first end of the connecting member being provided with a first connecting structure, a second end of the connecting member being provided with a second connecting structure connected to the mounting base, and the controller housing being fixedly connected or integrally formed with the first connecting structure;

wherein the second connecting structure is movable relative to the fixed mounting surface to adjust a position of the controller housing in a vertical direction.

13. The shutter controller according to claim 12, wherein the mounting base comprises a first mounting base and a second mounting base, the first mounting base is fixedly connected to the second connecting structure, the first mounting base is slidably connected to the second mounting base, the second mounting base is fixedly connected to the fixed mounting surface, and a position of the second connecting structure is adjusted by adjusting a relative position between the first mounting base and the second mounting base to adjust the position of the controller housing.

14. The shutter controller according to claim 13, wherein one of the first mounting base and the second mounting base is provided with a first sliding block, the other one of the first mounting base and the second mounting base is provided with a first sliding groove, and the first sliding block is slidably received in the first sliding groove.

15. The shutter controller according to claim 14, wherein a side wall of the first sliding groove is provided with a first positioning convex edge, a side wall of the first sliding block is provided with a second positioning convex edge cooperating with the first positioning convex edge, and when the first sliding block is placed in the first sliding groove, the second positioning convex edge is simultaneously placed in the first sliding groove.

16. The shutter controller according to claim 13, wherein the first mounting base or the second connecting structure is provided with a third engaging portion, the second mounting base is provided with a fourth engaging portion, and when the fourth engaging portion is engaged with the third engaging portion, the position of the second connecting structure is fixed.

17. The shutter controller according to claim 16, further comprising a pressing member connected to the first mounting base or the second connecting structure, wherein the pressing member is pressed to disengage third engaging portion from the fourth engaging portion, so as to enable the second connecting structure to move relative to the fixed mounting surface.

18. The shutter controller according to claim 17, wherein a first end of the pressing member is provided with an elastic connecting portion connected to the first mounting base or the second connecting structure, and a second end of the pressing member extends outward to form a pressing portion, the pressing member is capable of swinging between a first position and a second position by pressing the pressing portion, when the pressing member is located at the first position, the third engaging portion is engaged with the fourth engaging portion, and when the pressing member is located at the second position, the third engaging portion is separated from the fourth engaging portion.

19. The shutter controller according to claim 16, wherein one of the third engaging portion and the fourth engaging portion is provided with a wedge block, and the other one of the third engaging portion and the fourth engaging portion is provided with a rack configured to be engaged with the wedge block.

* * * * *